No. 739,989.

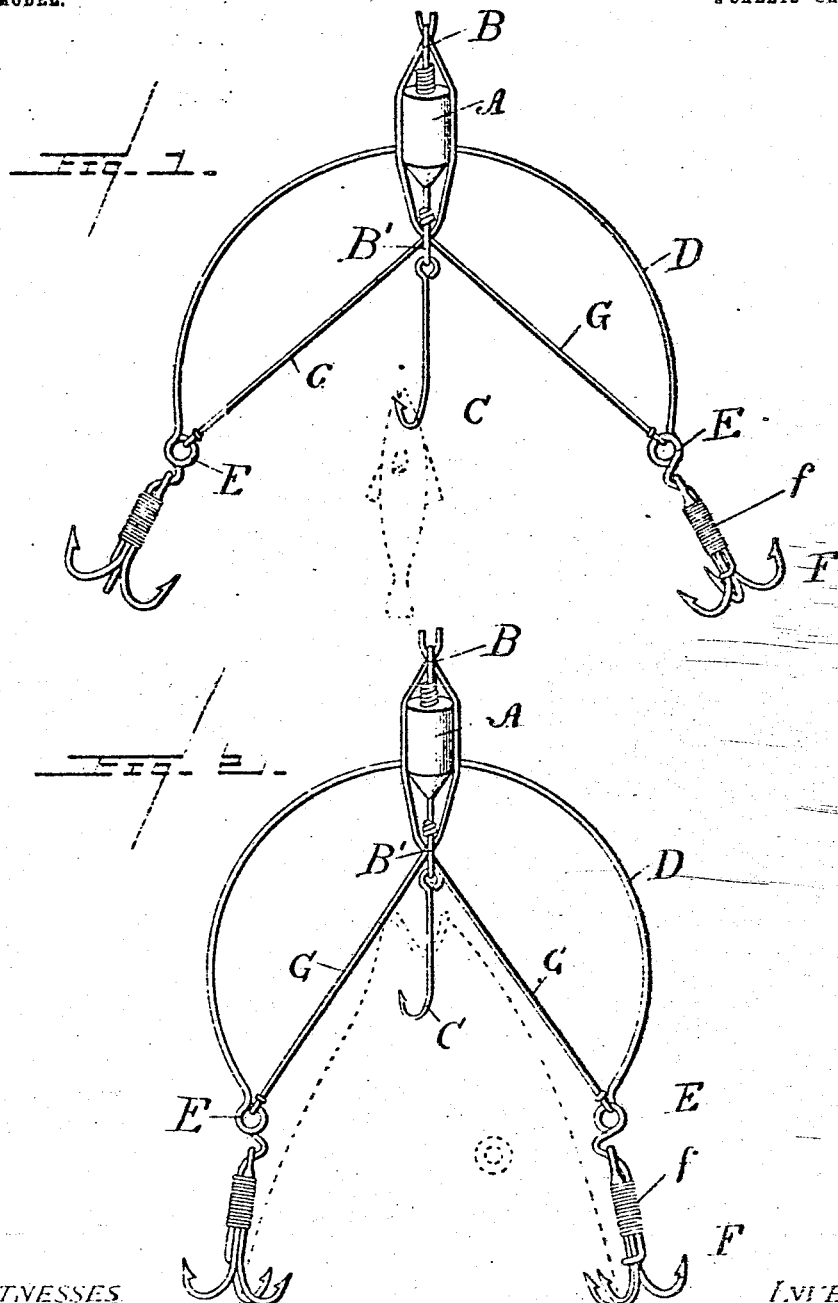

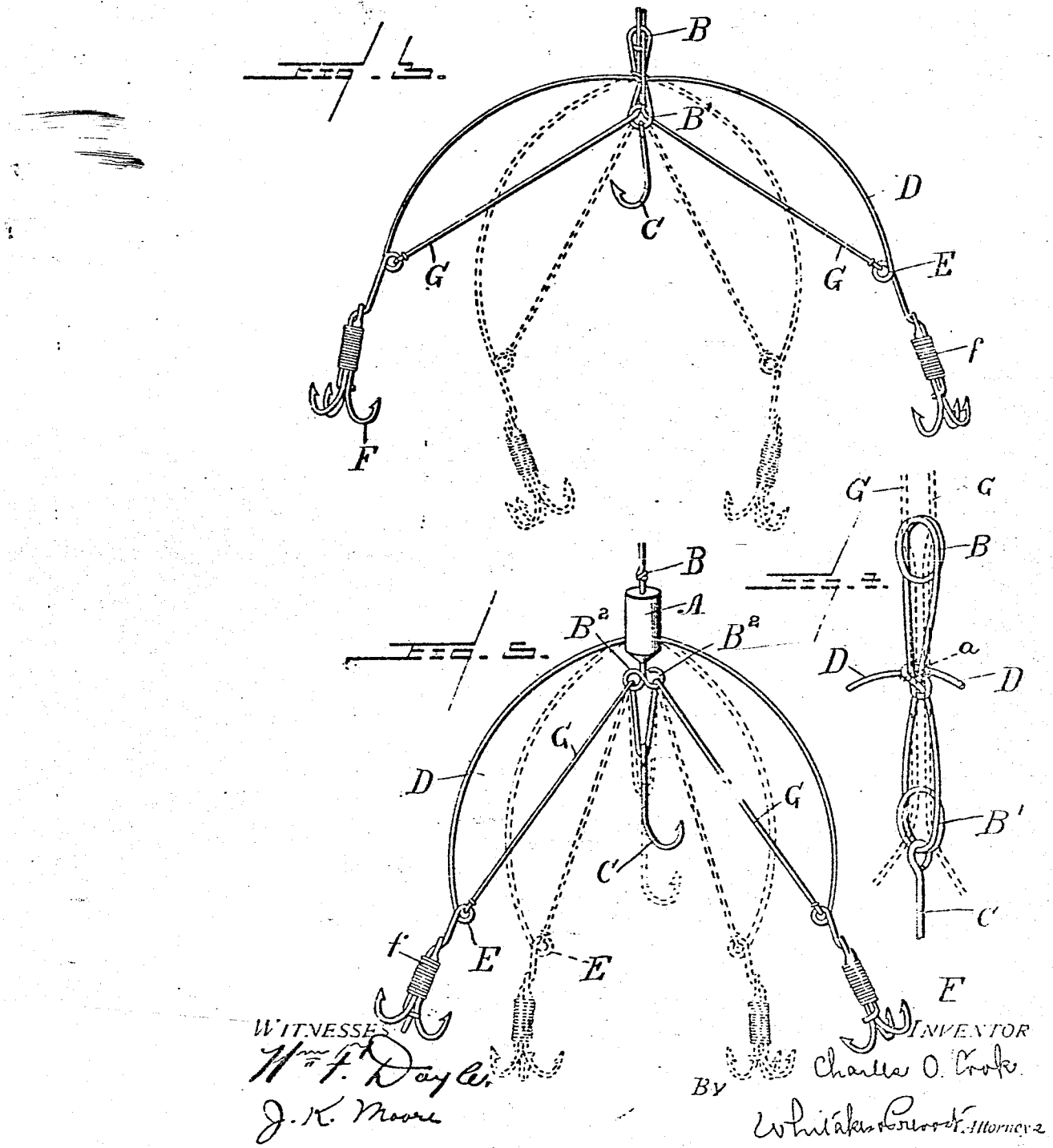

Patented September 29, 1903.

UNITED STATES PATENT OFFICE.

CHARLES O. COOK, OF AUBURN, NEW YORK, ASSIGNOR TO C. AUGUST KOENIG, OF AUBURN, NEW YORK.

FISH TRAP-HOOK.

SPECIFICATION forming part of Letters Patent No. 739,989, dated September 29, 1903.

Application filed January 12, 1903. Serial No. 138,741. (No model.)

*To all whom it may concern:*

Be it known that I, CHARLES O. COOK, a citizen of the United States, residing at Auburn, in the county of Cayuga and State of New York, have invented certain new and useful Improvements in Fish Trap-Hooks; and I do hereby declare the following to be a full, clear, and exact description of the invention, such as will enable others skilled in the art to which it appertains to make and use the same.

My invention relates to that class of hooks known as "fish trap-hooks," and has for its special object to provide a very simple but substantial means by which a fish may be prevented from all chance of escape after having once received the bait-hook in its mouth.

My invention consists in the novel construction clearly and fully set forth in the annexed specification and drawings.

In the drawings, Figure 1 is a front view of my improved fish-hook in its normal position. Fig. 2 is also a front view of said hook, but in its contracted position. Fig. 3 is a modification of my hook. Fig. 4 is an enlarged view of the main portion of Fig. 3. Fig. 5 is a further modification of the same.

In the drawings like letters of reference represent similar parts.

A in the drawings represents a main portion, as an ordinary sinker of lead or other suitable material and preferably of a cylindrical form, the ends of said main portion A being provided with the projecting eyes B and B', respectively.

C is an ordinary bait-hook attached to the eye B'.

D is a wire or other spring, preferably bow-shaped, although other forms of spring may be employed, which is attached at its center to the main portion A at a suitable point in the same, but in such a manner that its ends project in the same direction as the projecting eye B'. The spring D is provided near each end with a loop E, while to each of said ends is attached, by any suitable means $f$, a group of ordinary hooks F, preferably three in number.

G G are lines, each having one end attached to the loops E E, respectively, while their free ends are passed through the projecting eye B' in opposite directions, then in opposite directions through the projecting eye B, and then secured to the main line in any suitable manner; but it should be understood that other constructions may be employed which will procure the same results.

From the foregoing description the operation of my device is obvious and is as follows: When a fish bites the baited hook C, the fisherman ordinarily begins to tighten the line, while the fish generally resists by pulling on the said bait-hook C, which action would increase the tension on the lines G G. Therefore as the lines G G are attached to the spring D near its ends and the bait-hook C is attached to the center of said spring D, as by construction it is, when the bait-hook C is pulled and the lines G G tightened the spring D must yield, thus forcing the hooks F F, attached to its ends, into the fish's body, as shown in Fig. 2, thus preventing all chance of escape for the fish.

The construction of the modification shown in Fig. 3 is similar to that of Fig. 1, except that the main portion A is formed of one piece of wire bent in the manner shown in Fig. 4 and held in shape by any substantial means $a$, while the spring D is formed by the continuation of the ends of the wire forming the main portion A. The operation of this device is the same as that of Fig. 1, as shown by the dotted lines in said Fig. 3.

The further modification shown in Fig. 5 is of substantially the same construction as that of Fig. 1, except that instead of the single projecting eye B' in Fig. 1 preferably two projecting eyes B² B² are attached to the lower end of the main portion or sinker A, while the free ends of the lines G G are passed through the projecting eyes B² B², respectively, and then attached to the bait-hook C, which is not secured to the main portion or sinker A as in Fig. 1, and the main line in this construction is secured to the projecting eye B. With these changes it is evident that the operation of this construction is substantially the same as that of Fig. 1, except in the latter the bait-hook C when pulled directly tightens the lines G G, thus bringing the ends of the spring D closely together, as shown by the dotted lines in Fig. 5.

What I claim, and desire to secure by Letters Patent, is—

1. A fish trap-hook comprising a main portion provided with spring-arms having a hook or hooks at their outer ends, said spring-arms tending normally to hold the hooks apart, a hook intermediate said arms, and means for connecting the ends of said spring-arms whereby a draft on the intermediate hook will cause the outer ends of said arms and hooks secured thereto to closely approach each other, substantially as described.

2. In a fish trap-hook, the combination with a main portion, of spring-arms secured thereto provided with a plurality of hooks, said spring-arms tending normally to hold the hooks apart, a hook intermediate of said arms and means for connecting the ends of said spring arms, whereby a draft on said intermediate hook will cause the outer ends of said arms and hooks secured thereto to closely approach each other, substantially as described.

3. In a fish trap-hook, the combination of a main portion, of spring-arms secured thereto provided with one or more hooks, a hook secured to said main portion intermediate said arms, lines secured to said spring-arms near the outer ends and adapted to be connected with the main line, the said parts being so arranged that a draft on the intermediate hook will cause the outer ends of the spring-arms and hooks secured thereto to closely approach each other, substantially as described.

4. In a fish trap-hook, the combination with the main portion, of spring-arms provided with hooks secured thereto, said spring-arms tending normally to hold the hooks apart, flexible connections secured to said spring-arms, and a hook in line with the main body, the arrangement being such that a draft on said hook will cause the ends of the spring-arms to closely approach each other, substantially as described.

5. In a fish trap-hook, the combination with the line, of a main body movable in respect to said line, of spring-arms connected to said main body and provided with hooks, flexible connections between said spring-arms and the line, an intermediate hook connected with the main body whereby a draft on said hook will cause the outer ends of said arms to closely approach each other, substantially as described.

In testimony whereof I affix my signature in the presence of two witnesses.

CHARLES O. COOK.

Witnesses:
EDMUND GLAVIN,
THOMAS F. MALLON.